United States Patent [19]
Juri et al.

[11] 3,718,850
[45] Feb. 27, 1973

[54] SEMICONDUCTOR RECTIFIER DEVICE

[75] Inventors: Isao Juri, Kazuo Koguchi, Toshimi Kuroiwa, Tomoyuki Koken, all of Tokyo, Japan

[73] Assignee: Tokyo Shibaura Electric Company, Ltd., Kawasaki-shi, Japan

[22] Filed: July 15, 1971

[21] Appl. No.: 163,006

[30] Foreign Application Priority Data

July 17, 1970 Japan .................................45/62314
July 17, 1970 Japan .................................45/62315
July 17, 1970 Japan .................................45/62317

[52] U.S. Cl. ....................321/8 C, 317/100, 336/105
[51] Int. Cl. ........H02m 7/00, H02b 1/00, H01f 17/00
[58] Field of Search ...............321/8, 8 C; 336/5, 105; 317/100

[56] References Cited

UNITED STATES PATENTS

| | | | |
|---|---|---|---|
| 3,173,061 | 3/1965 | Storsand | 321/8 C |
| 3,361,951 | 1/1968 | Thorne et al. | 321/8 C |
| 3,370,216 | 2/1968 | Bowar et al. | 321/8 C |

FOREIGN PATENTS OR APPLICATIONS

| | | | |
|---|---|---|---|
| 972,096 | 5/1959 | Germany | 321/8 R |
| 1,357,702 | 3/1964 | France | 321/8 C |
| 504,757 | 2/1952 | Canada | 317/100 |

*Primary Examiner*—William H. Beha, Jr.
*Attorney*—Norman F. Oblon et al.

[57] ABSTRACT

A semiconductor rectifier device includes a transformer enclosure having a transformer therein and a plurality of separate rectifier unit tanks. A plurality of output terminals each of which corresponds to a phase winding of the transformer are provided and extend through at least one of the side walls of the transformer enclosure. Each of the rectifier unit tanks contains semiconductor rectifier elements therein for rectifying a given phase of the output of the transformer and is mounted on the side wall of the transformer enclosure. The input terminals to the unit tanks are respectively connected to the output terminals of the transformer.

6 Claims, 11 Drawing Figures

SEMICONDUCTOR RECTIFIER DEVICE

BACKGROUND OF THE INVENTION

1. Field of the Invention

This invention generally relates to a semiconductor rectifier device, and more particularly to a semiconductor rectifier device in which a plurality of unit tanks, each of which includes semiconductor rectifier elements therein for rectifying one phase of the output voltage of a transformer, are mounted on the side walls of the transformer.

2. Description of the Prior Art

In the past, large current semiconductor rectifier devices have included the combination of a transformer and a rectifier. The prior art semiconductor rectifier devices were generally constructed in two different ways. In one type, the rectifier device utilized a transformer enclosure and a rectifier cubicle located nearby having all of the semiconductor rectifier elements therein. In the other type, the rectifier device would have the semiconductor rectifier elements mounted in a transformer enclosure with a transformer.

While somewhat satisfactory, in the former type of rectifier device, one problem was that separate equipment had to be provided to connect the output terminals of the transformer enclosure with input terminals of the rectifier cubicle. Again while somewhat satisfactory, in the latter type of rectifier device the coolant of the rectifier, such for example as an insulated oil, had to be simultaneously used as the insulating oil for the transformer. One problem here was that the temperature of the coolant would become undesirably high because of heating by the transformer. Another problem in the latter type rectifier device was that the construction was complicated in that the rectifier and the transformer were not independently constructed.

Furthermore, in both of the prior art types of rectifier devices, if some of the rectifier elements thereof were destroyed or damaged, they could not be easily replaced or repaired, since first the coolant would have to be exhausted, second the transformer enclosure or the rectifier cubicle would have to be opened, third the destroyed or damaged semiconductor rectifier elements would have to be located, and finally the replacement or repair would have to be made. As a result of the above time consuming and complicated procedure, the rectifier device would continue to be inoperative for a long period of time.

In addition, in the prior art types of rectifier devices, the rectified dc current flowing through the rectifier elements in the rectifier cubicle would induce a magnetic flux. The magnetic flux would in turn cause heat and thereby elevate the temperature of all the parts in the rectifier cubicle. Such a heating of the rectifier elements was very undesirable and often would cause a breakdown of the same.

SUMMARY OF THE INVENTION

Accordingly, it is one object of the present invention to provide a new and improved unique semiconductor rectifier device.

It is another object of the present invention to provide a new and improved unique semiconductor rectifier device in which the rectifier elements thereof can be easily replaced or repaired when destroyed or damaged.

It is still another object of the present invention to provide a new and improved unique semiconductor rectifier device which is compact and easy to construct.

It is one other object of the present invention to provide a new and improved unique semiconductor rectifier device in which magnetic heating induced by current flow is prevented.

It is yet one further object of the present invention to provide a new and improved unique semiconductor rectifier device in which the rectified current thereof can be easily led to a dc load bus bar without the need for any connection means.

Briefly, in accordance with this invention the foregoing and other objects are in one aspect attained by the provision of a transformer enclosure having side walls and including a polyphase electric power transformer unit mounted therein and a plurality of leadout terminals which extend through at least one of the side walls of the enclosure. The leadout terminals are respectively connected to the different phase windings of the polyphase winding of the electric power transformer. A plurality of rectifier unit tanks are also provided, and are mounted on a side wall of the transformer enclosure. Each of the rectifier unit tanks includes semiconductor rectifier elements therein, and the input terminals of the rectifier unit tanks are respectively connected to the output terminals of the transformer for rectifying the output current thereof.

BRIEF DESCRIPTION OF THE DRAWINGS

A more complete appreciation of the invention will be readily apparent as the same becomes better understood, by reference to the following detailed description when considered in connection with the drawings wherein.

DETAILED DESCRIPTION OF THE PREFERRED EMBODIMENTS

Figure 1:
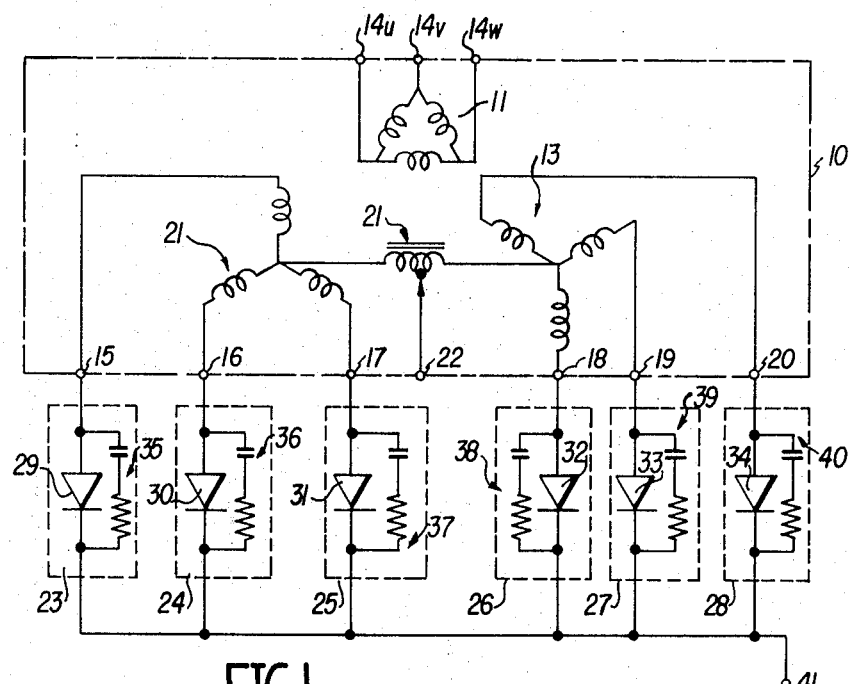
FIG. 1 is a circuit diagram of a transformer and a rectifier for explaining the present invention.

Referring now to the drawings wherein like reference numerals designate identical or corresponding parts throughout the several views, and more particularly to FIG. 1 thereof wherein a transformer 10 is shown as being designated by a block of dot and dashed lines, and includes a three phase primary winding 11 and a pair of star connected polyphase secondary windings 12 and 13. The three phase primary winding 11 includes a u-phase, a v-phase and a w-phase winding and the same are respectively connected to input terminals 14u, 14v and 14w. An ac input power (not shown) is supplied to the primary winding 11 at the input terminals 14u, 14v and 14w.

Each of the phase windings of the pair of secondary windings 12 and 13 are connected to a respective output terminal 15 through 20. An interphase reactor 21 is also provided and is connected, as shown, between two neutral points of the secondary windings 12 and 13. A center tap of the interphase reactor 21 is provided and is connected to a negative output terminal 22. Six rectifier units 23 through 28 are provided and are respectively connected to the output terminals 15 through 20 of the transformer 10. Each of the rectifier units 23 through 28 includes a respective rectifier element 29 through 34 and a respective surge-absorbing circuit 35 through 40. Each of the surge-absorbing circuits 35 through 40 includes a serially connected resistance and capacitance element which are connected in parallel to the respective rectifier elements 29 through 34. It should be understood that while each of the semiconductor rectifier elements 29 through 34 are shown in FIG. 1 as having only a single element that in an actual rectifier unit tank, a plurality of semiconductor elements would be provided and connected in parallel and/or in series in response to the voltage and current levels of the power supply.

Rectified dc outputs of each of the rectifier units 23 through 28 are connected to each other to make a positive terminal 41, and a dc load (not shown) will be connected between the positive terminal 41 and the negative output terminal 22.

Figure 2:
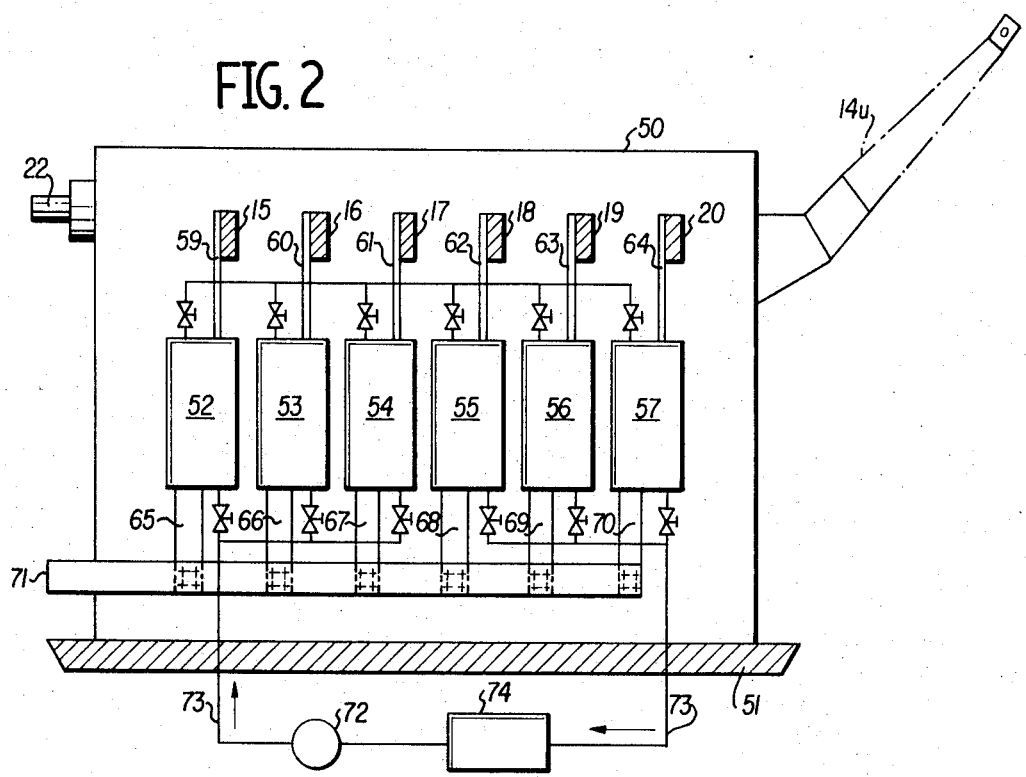
FIGS. 2 and 3 are a front view and a side view of one preferred embodiment of a semiconductor rectifier device according to the present invention.
Figure 3:
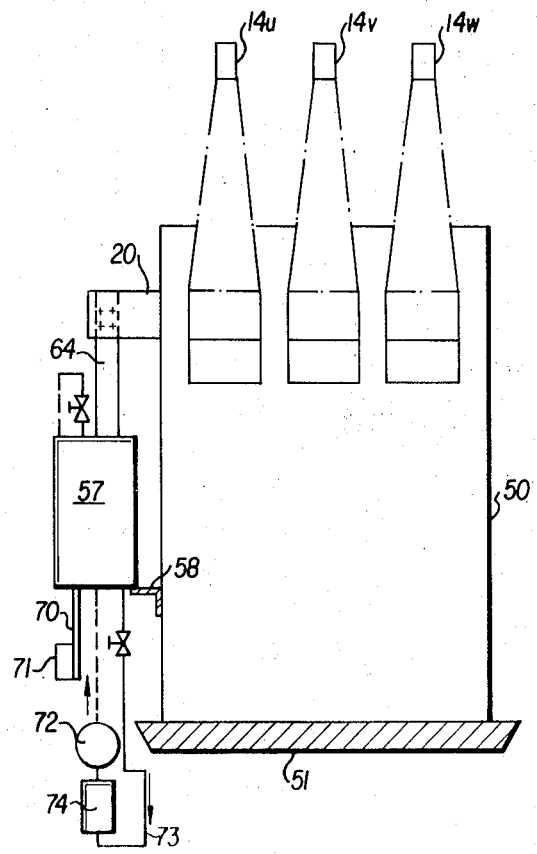

FIGS. 2 and 3 show the front and side views of a transformer enclosure and rectifier unit tanks, in accordance with this invention. The transformer 10 of FIG. 1 is packed within a transformer enclosure 50. The output terminals 15 through 20 of the transformer 10 are provided on one wall of the enclosure 50. The input terminals 14u, 14v and 14w may be provided on another wall of the enclosure 50. The negative output terminal 22 may be provided on still another wall of the enclosure 50. The transformer enclosure 50 is placed on a base 51.

The rectifiers 23 through 28 are mounted in respective rectifier unit tanks 52 through 57. The rectifier unit tanks 52 through 57 are placed near the enclosure 50, and are sustained by a support member 58, which is fixed on the wall of the transformer enclosure 50. Then ac bus bars 59 through 64 and dc bus bars 65 through 70 are provided for use as the input and output conductor leads for the respective rectifier unit tanks 52 through 57. Each of the ac bus bars 59 through 64 of the rectifier unit tanks 52 through 57 are respectively connected to the output terminals 15 through 20. Each of the dc bus bars 65 through 70 are connected to a dc load bus bar 71 to make the positive terminal 41 as shown in FIG. 1. A coolant, which may be for example an electric insulating oil, flows upwardly or downwardly through the rectifier unit tanks 52 through 57 to cool the rectifier elements therein. The coolant is pumped out of the rectifier unit tanks 52 through 57 by a pump 72 through a pipeline 73 in the direction as shown by the arrow in FIG. 2. After cooling the rectifier elements, the coolant which is thereby heated is returned to a cooler 74 for removal of the heat therefrom and then is supplied to the intake of the pump 72. Valves are provided near the inlets and outlets to the rectifier unit tanks 52 through 57 for enabling the pipeline 73 to be opened or closed.

Figure 5:
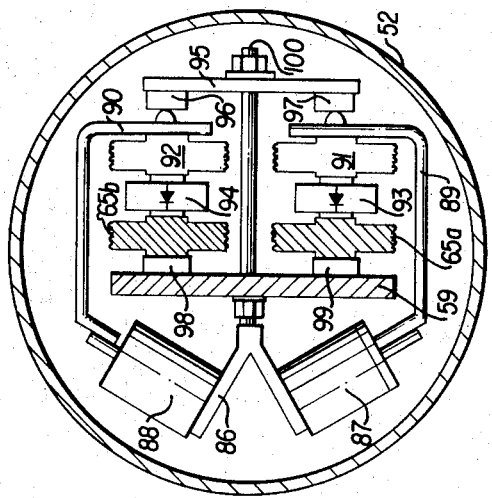
FIG. 5 is a cross-sectional view taken along the line $x-x$ of FIG. 4.
Figure 4:
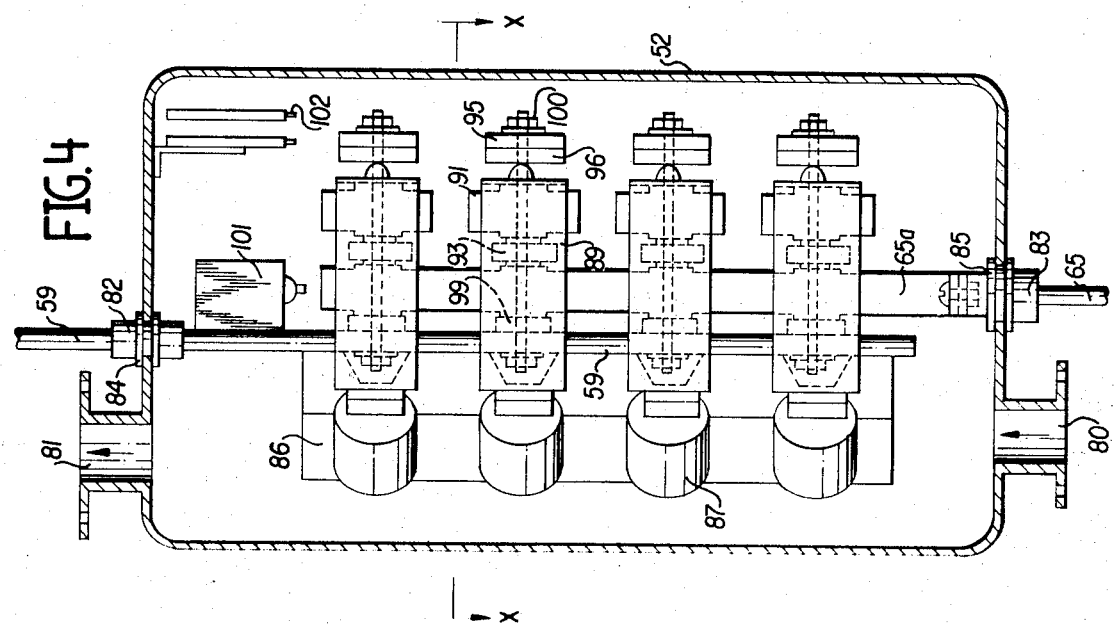
FIG. 4 is a longitudinal cross-sectional view of one embodiment of a unit tank according to the present invention.

The details of the rectifier unit tanks 52 through 57 will now be described in connection with FIGS. 4 and 5. Since all of the rectifier unit tanks 52 through 57 may be the same, only one of them, for example the rectifier unit tank 52 will be explained. FIG. 4 shows a longitudinal sectional view of the rectifier unit tank 52, and FIG. 5 is a cross-sectional view taken along the line x—x of FIG. 4.

In the rectifier unit tank 52, the coolant flows from an inlet conduit 80 to an outlet conduit 81 and thereby cools the rectifier elements. Bushings 82 and 83 are provided through upper and lower walls of the unit tank 52, and the ac leadout conductor or ac bus bar 59 and the dc leadout conductor or dc bus bar 65 are respectively provided through the bushings 82 and 83. An oil shield packing member 84 is provided at the connecting point between the bushing 82 and the upper wall of the rectifier unit tank 52 in order to prevent any leaking of oil. Another oil shield packing member 85 is provided at the connecting point between the bushing 83 and the lower wall of the rectifier unit tank 52 in order to prevent any leaking of oil. A condenser 101 and a resistor 102 are mounted below the upper wall of the unit tank 52 so as to provide the surge-absorbing circuit 35.

A Y-type conductor 86 is provided and is connected to the ac bus bar 59. A pair of fuses 87 and 88 are provided and are respectively connected to each branch of the Y-type conductor 86. A pair of conductor leads 89 and 90 are provided and are respectively connected at one end to cooling fins 91 and 92 and at the other end to the fuses 87 and 88. A pair of rectifier elements 93 and 94 are respectively interposed between the cooling fins 91 and 92 and the dc bus bars 65a and 65b. The dc bus bars 65a and 65b are connected to the leadout bus bar 65. An arm member 95 is provided and two pairs of insulators 96, 97, 98 and 99 are respectively provided between the arm 95 and the conductor leads 89 and 90, and between the ac bus bar 59 and the dc bus bars 65a and 65b. The insulators 96 through 99, the conductor leads 89 and 90, the cooling fins 91 and 92, the rectifier elements 93 and 94 and the dc bus bars 65a and 65b are collectively fixed between the arm 95 and the ac bus bar 59 by an insulated bolt 100. A portion of the Y-type conductor 86 where it touches the insulated bolt 100 is cut out.

An ac input current is supplied to the ac bus bar 59, so that current will flow through the Y-type conductor 86, the fuses 87 and 88, the cooling fins 91 and 92, the rectifier elements 93 and 94 and the dc bus bars 65a and 65b, and thereby be rectified.

It should now be apparent that according to the embodiment of this invention as described above since a separate rectifier unit tank is provided for each phase of a transformer, when the rectifier elements in one of the rectifier unit tanks are damaged or destroyed that unit tank can be easily altered or repaired. Also, the individual rectifier unit tanks of the present invention are compact and easily constructed as compared to the single rectifier cubicle of the prior art which would include all of the rectifier elements for rectifying all of the phases of the transformer 10.

Furthermore, it is well known that the flow of a dc current induces a magnetic flux which may cause the unit tank 52, the rectifier elements 93 and 94 and the other parts thereof to heat. This effect is undesirable since rectifier elements are very sensitive to heat and often break down in the presence thereof. It is known that heating due to an induced magnetic flux can be prevented by causing a current which is inverse to the rectifier current.

In the foregoing embodiment of the present invention, as described above, since the wall of the rectifier unit tank is made of a conductive material and is electrically connected to the dc bus bar 65 at the lower portion of the unit tank 52, the rectified dc current will flow through the dc bus bar from an upward to a downward direction in the rectifier unit tank and then through the wall of the rectifier unit tank from a downward to an upward direction, so that any induced magnetic fluxes will compensate and thereby nullify each other.

Figure 7:
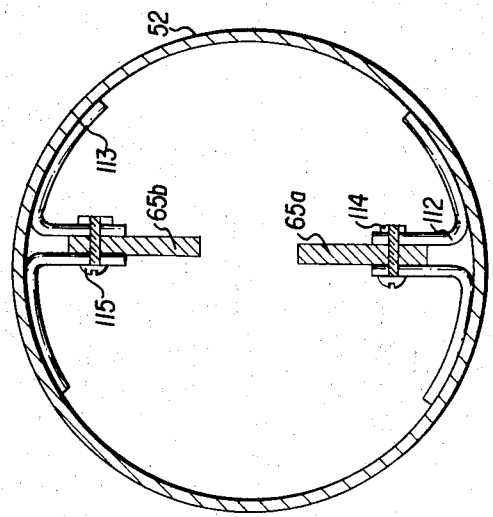
FIG. 7 is a cross-sectional view taken along the line $y-y$ of FIG. 6.
Figure 6:
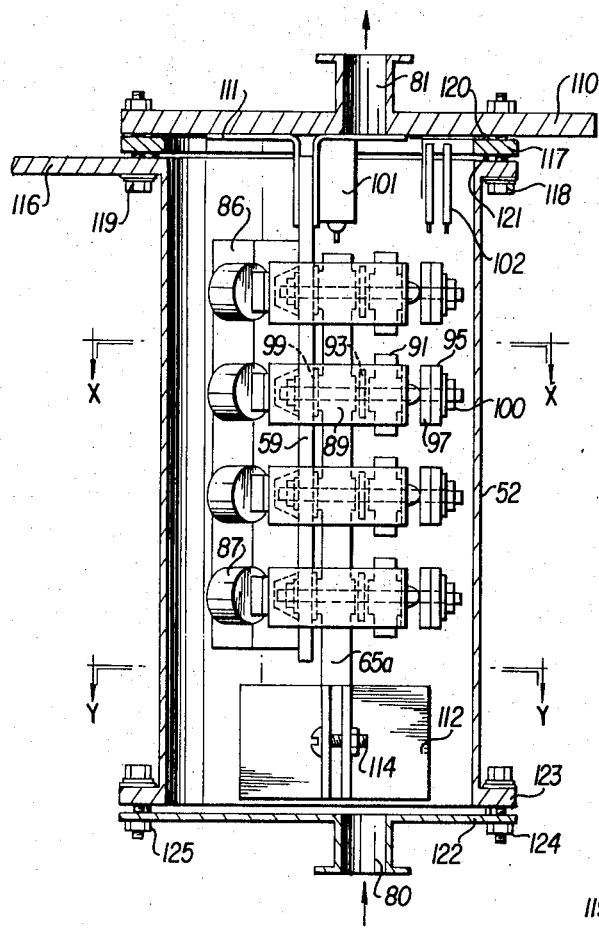
FIG. 6 is a longitudinal cross-sectional view of another and alternative preferred embodiment of a unit tank according to the present invention.

Referring now to FIGS. 6 and 7, another and alternative embodiment of the rectifier unit tank of the present invention as described above will be explained. FIG. 6 is a longitudinal sectional view of the rectifier unit tank, and FIG. 7 is a cross-sectional view taken along the line y—y of FIG. 6. The cross section of FIG. 6 taken along the line x—x is the same as that of FIG. 5.

In FIG. 6 an upper lid 110 is also used as a conductor lead. A connectable conductor 111 is provided and is welded to the upper lid 110. The connectable conductor 111 is also connected to the ac bus bar 59 by bolts (not shown) or by any other suitable means. The lower ends of the pair of dc bus bars 65a and 65b are connected to connectable conductors 112 and 113 by respective bolts 114 and 115 and the connectable conductors 112 and 113 are welded to the wall of the rectifier unit tank 52. A flange 116 and an insulator 117 are provided, and are fixed to the upper lid 110 by respective insulated bolts 119 and 118 with piled packings 120 and 121. The flange 116 is electrically connected to the wall of the unit tank 52, but is insulated from the upper lid 110. A lower lid 122 is provided and may or may not be a conductor, and is fixed with a flange 123 by bolts 124 and 125. The lower lid 122 can be eliminated in the event that the rectifier unit tank 52 is casted so as to be closed at the bottom. In the closed bottom type of unit tank 52, it can be easily understood that suitable means to connect the dc bus bar 65 with the wall of the rectifier unit tank 52 would be provided such as of the type shown in FIG. 10 which is described hereinafter.

Now, according to the above embodiment, the rectified dc current will flow first through the dc bus bars 65a and 65b from an upward to a downward direction, and then through the wall of the rectifier tank 52 from a downward to an upward direction and then be led to the dc load bus bar from the flange 116. Any magnetic flux induced by the current flowing through the dc bus bars 65a and 65b will be of an opposite direction to the magnetic flux induced by the current flowing through the wall of the rectifier unit tank 52, so that the same will compensate and nullify each other.

It should be understood that the flange 116 and also the flanges of the other unit tanks in FIG. 6 are connected to the dc load bus bar 71 as shown in FIGS. 2 and 3. On the other hand, since a large current will flow in the dc load bus bar 71, the size thereof is constructed so as to be very thick. Now, if the dc load bus bar 71 is utilized in place of the support member 58 in FIG. 3, then the connecting means for the flanges and the dc load bus bar 71 can be eliminated and a rectifier device which is very compact and easily constructed is realized. This can be easily obtained, as shown in FIG. 8, and described as follows.

Figure 8:
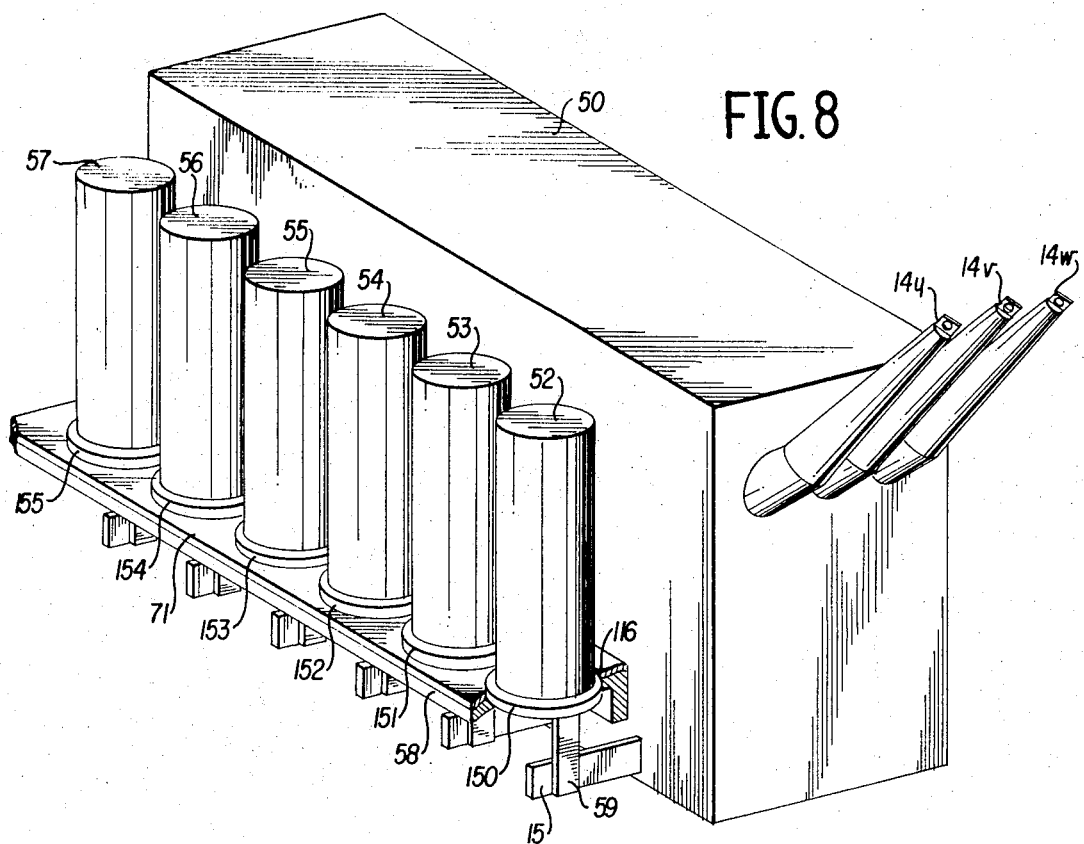
FIG. 8 is a perspective view of still another preferred embodiment of a semiconductor rectifier device according to the present invention.

In FIG. 8, the dc load bus bar 71 is mounted on the supporting member 58 and is also used as the supporting member of the unit tanks 52 through 57. Holes 150 through 155 are provided in the dc load bus bar 71 and the size of the holes are a little larger than the upper lid 110. The unit tanks 52 through 57 are placed on the dc load bus bar 71 and positioned in an upward to a downward fashion as opposed to FIG. 6. The upper lid 110 for each of the unit tanks is fitted in a respective one of the holes 150 through 155 and is not connected to the dc load bus bar 71. In this manner the flange 116 and the other flanges are positioned on the dc load bus bar 71 to support the unit tanks 52 through 57. The flange 116 and the dc load bus bar 71 are then directly and electrically connected to each other with the connecting means being eliminated. It should be understood that the output terminals 15 through 20 are provided at the lower portion of the wall of the transformer enclosure 50, and are connected to each of the upper lids.

According to the embodiment as described above, it should now be apparent that the dc load bus bar 71 is used as a support member for the unit tanks 52 through 57 such that connecting means are eliminated thereby enabling a compact rectifier device.

Figure 11:
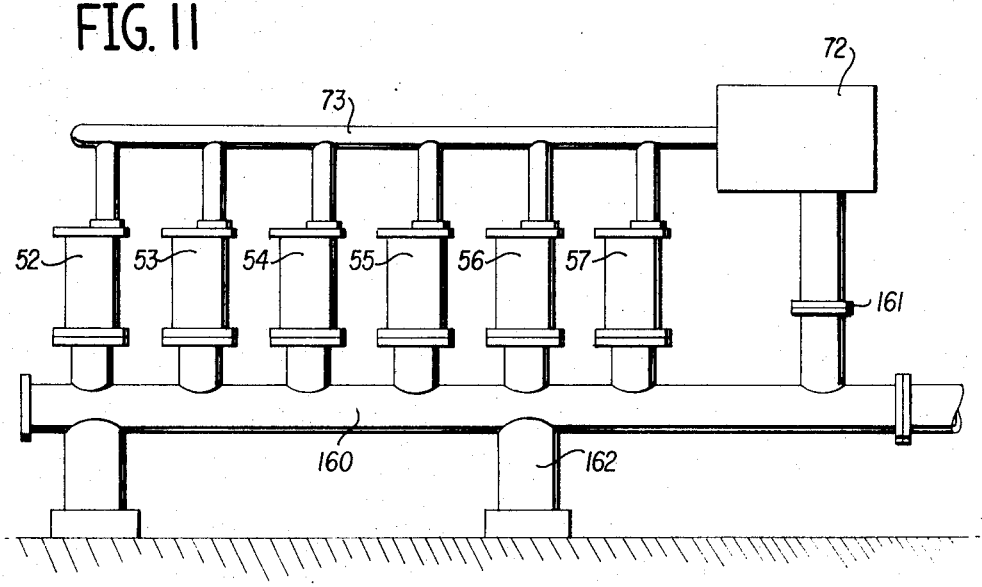

Furthermore, according to the above described embodiment of FIG. 8, the pipeline of the coolant can now be used as the dc load bus bar 71. This arrangement is shown in FIG. 11. In FIG. 11, the transformer enclosure is now shown, and the pipeline 160 is used as the dc load bus bar and is mounted on a base 162. The pipeline 160 is insulated from the pump 72 at the connecting point 161.

In all of the above described embodiments, it should be understood that the same have been based upon the transformer arrangement 10 of FIG. 1 wherein a double star connection is provided. Obviously the invention is not so limited and a modified double star connection is shown and will now be described in reference to FIG. 9. In this arrangement two adjacent terminals corresponding to each phase winding are provided. One of the two adjacent terminals is an output terminal and the other is a neutral terminal. The direction of the current flowing at the output terminal 15 will be opposite to the current flowing at the neutral terminal 22a. It can easily be understood that heat caused by magnetic flux induced by the dc bus bar will be compensated for by a current through the wall of the unit tank which is the same as the current flowing at the neutral terminal 22a.

Figure 9:
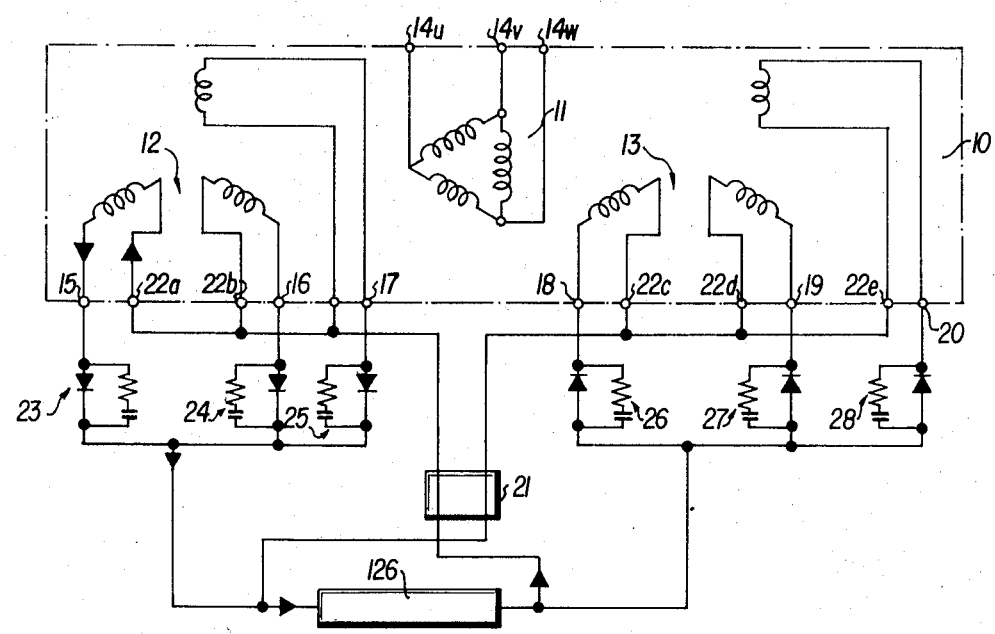
FIG. 9 is a circuit diagram of a transformer and a rectifier for explaining yet one other preferred embodiment of a unit tank according to the present invention.
Figure 10:
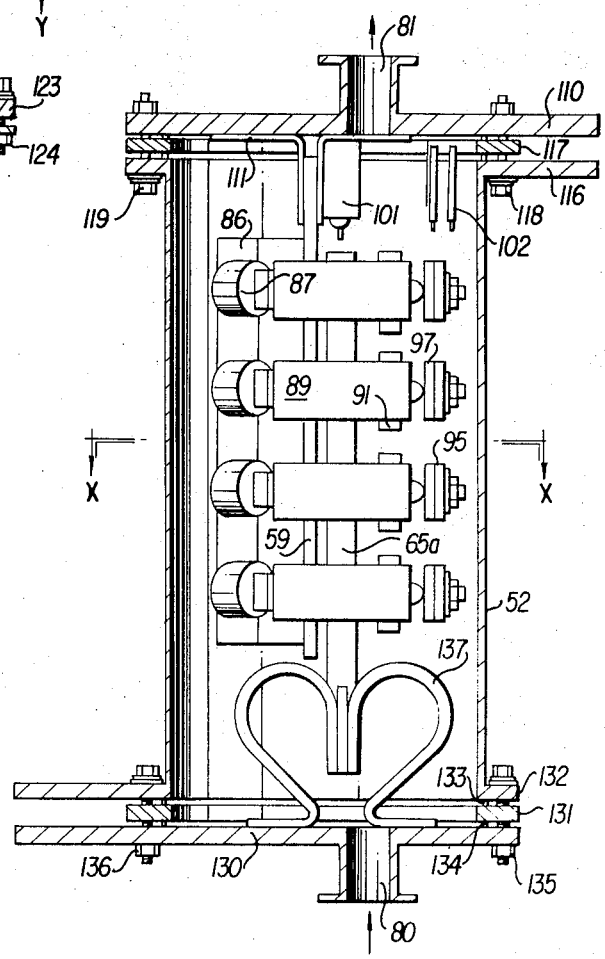
FIG. 10 is a longitudinal cross-sectional view of another embodiment of a unit tank according to the present invention; and, FIG. 11 is a perspective view of still another and alternative preferred embodiment of a semiconductor rectifier device according to the present invention.

FIG. 10 shows still another and alternative embodiment of a unit tank 52 suitable for use in the embodiment of FIG. 9. The cross section $x-x$ of FIG. 10 is the same as that corresponding to FIG. 5. It should also be understood that the upper lid 110, the flange 116, the insulator 117, the insulated bolts 118 and 119, the piled packings 120 and 121 and the connectable conductor 111 are the same as those shown in FIG. 6.

In FIG. 10, a lower lid 130 for the unit tank 52 is provided and is made of a conductive material. An insulator 131, a flange 132, and piled packings 133 and 134 are provided and fixed by insulated bolts 135 and 136 in the same manner as that described for the upper lid 110. The flange 116 and 132 are electrically connected to the wall of the unit tank 52, but are insulated from the upper lid 110 and the lower lid 130. On the other hand, the dc bus bars 65a and 65b are electrically connected to the lower lid 130 by a spring conductor 137.

The flange 116 may be connected to the neutral terminal 22a shown in FIG. 9, and the load 126 in FIG. 9 is connected between the lower lid 130 and the flange 132. The rectified current will flow through the dc bus bars 65a and 65b, the spring conductor 137, the lower lid 130, the load 126, the flange 132, the wall of unit tank 52, the flange 116 and then to the neutral terminal 22a. Any magnetic flux induced by the current flowing in the dc bus bars 65a and 65b will be compensated for by the magnetic flux induced by the current flowing in the wall of the unit tank 52.

In the above embodiment, since the lower lid 130 must be connected to a dc load bus bar, as compared to FIG. 8, it can be easily understood that the dc load bus bar can be used as a support member for the unit tank.

It should now be apparent that in accordance with the teachings of the present invention, a semiconductor rectifier device is provided such that when the semiconductor elements therein are destroyed or damaged they can be easily altered or repaired due to the utilization of rectifier unit tanks. Moreover, a semiconductor rectifier is provided in which heat due to the magnetic flux induced by the rectified current is prevented by the provision of an inverse current which flows through the walls of the unit tanks. Furthermore, a semiconductor rectifier device is provided which is compact and easily constructed by using a dc load bus bar as a support member of said unit tanks.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent is:

1. A semiconductor rectifier device comprising:
   a transformer enclosure having side walls;
   a polyphase electric power transformer unit mounted in said enclosure and having a plurality of leadout terminals which extend through at least one of the side walls of said transformer enclosure, said leadout terminals providing output terminals for the polyphase winding of said electric power transformer,
   a plurality of rectifier unit tanks mounted on at least one of the side walls of said transformer enclosure, each of said rectifier unit tanks including at least a semiconductor rectifier element therein and having input terminals which are respectively connected to said output terminals for rectifying an output current of said transformer; and,
   wherein a dc bus bar is further included and wherein said plurality of unit tanks are provided with walls and wherein the rectified output current of said transformer flows through said dc bus bar, while an inverse current flows through a wall of said unit tanks.

2. A semiconductor rectifier device according to claim 1, wherein a plurality of flanges are further included, each corresponding to a respective one of said plurality of unit tanks and electrically coupled thereto such that the rectified current flows through said dc bus bar, and then in turn flows through a wall of said unit tanks, whereby the rectified current is provided at the flange which is electrically coupled to the wall of said unit tanks.

3. A semiconductor rectifier device according to claim 1, wherein said plurality of unit tanks are provided with walls and wherein the rectified current flows through said dc bus bar while a neutral current flows through a wall of said unit tanks.

4. A semiconductor rectifier device comprising:
   a transformer enclosure having side walls;
   a polyphase electric power transformer unit mounted in said enclosure and having a plurality of leadout terminals which extend through at least one of the side walls of said transformer enclosure, said leadout terminals providing output terminals for the polyphase winding of said electric power transformer,
   a plurality of rectifier unit tanks mounted on at least one of the side walls of said transformer enclosure, each of said rectifier unit tanks including at least a semiconductor rectifier element therein and having input terminals which are respectively connected to said output terminals for rectifying an output current of said transformer; and,
   wherein a dc bus bar and a supporting member are further included, said unit tanks being supported on said dc load bus bar and said dc bus bar being mounted on said supporting member which in turn is fixed to said enclosure.

5. A semiconductor rectifier device according to claim 4, wherein a pipeline is provided for enabling a coolant to be applied to the interior of said rectifier device and wherein said pipeline is also used as said dc load bus bar.

6. A semiconductor rectifier device according to claim 4, wherein said plurality of rectifier unit tanks includes a serially connected condenser and resistor connected in parallel with said at least a semiconductor rectifier element.

* * * * *